Jan. 25, 1955  J. H. MURPHY  2,700,437
BRAKE ACTUATING MECHANISM
Filed Nov. 8, 1950  2 Sheets-Sheet 1

INVENTOR.
JOHN H. MURPHY
BY
ATTORNEYS

Jan. 25, 1955

J. H. MURPHY 2,700,437

BRAKE ACTUATING MECHANISM

Filed Nov. 8, 1950

INVENTOR.
JOHN H. MURPHY
BY
ATTORNEYS

United States Patent Office 2,700,437
Patented Jan. 25, 1955

2,700,437

BRAKE ACTUATING MECHANISM

John H. Murphy, Detroit, Mich., assignor to Detroit Duo-Grip Brake Corporation, Detroit, Mich., a corporation of Michigan Application November 8, 1950, Serial No. 194,689

7 Claims. (Cl. 188—76)

This invention relates broadly to brakes for automotive vehicles and more specifically to improvements in the design and assembly of the brake shoes, supports, and actuating mechanism therefor.

One of the objects of the invention is to provide a brake shoe support which will allow the dismantling of the brake assembly for the purpose of lining replacement without disassembling the wheel.

Another object of the invention is to provide mounting structure for the brake shoes which will permit floating movement for self-alignment in either the braking or released positions for uniform braking action and the prevention of binding in the event the drum surface departs from true circular form due to manufacturing error or to expansion or contraction caused by changes in temperature.

A still further object of this invention is to provide a cam surface on one of the brake shoes for engagement by the actuating means which will compensate for the radial difference between the inner and outer shoes and thus obtain uniform braking action as the actuating force is applied.

Another object of the invention is to construct a brake mechanism which is economic of manufacture, sturdy of structure, and susceptible to ready adjustment in compensation of wear of the brake lining.

Other objects and advantages more or less ancillary to the foregoing and the manner in which all the various objects are realized will appear in the following description which, considered in connection with the accompanying drawings sets forth the preferred embodiment of the invention.

Referring to the drawings.

Figure 1:
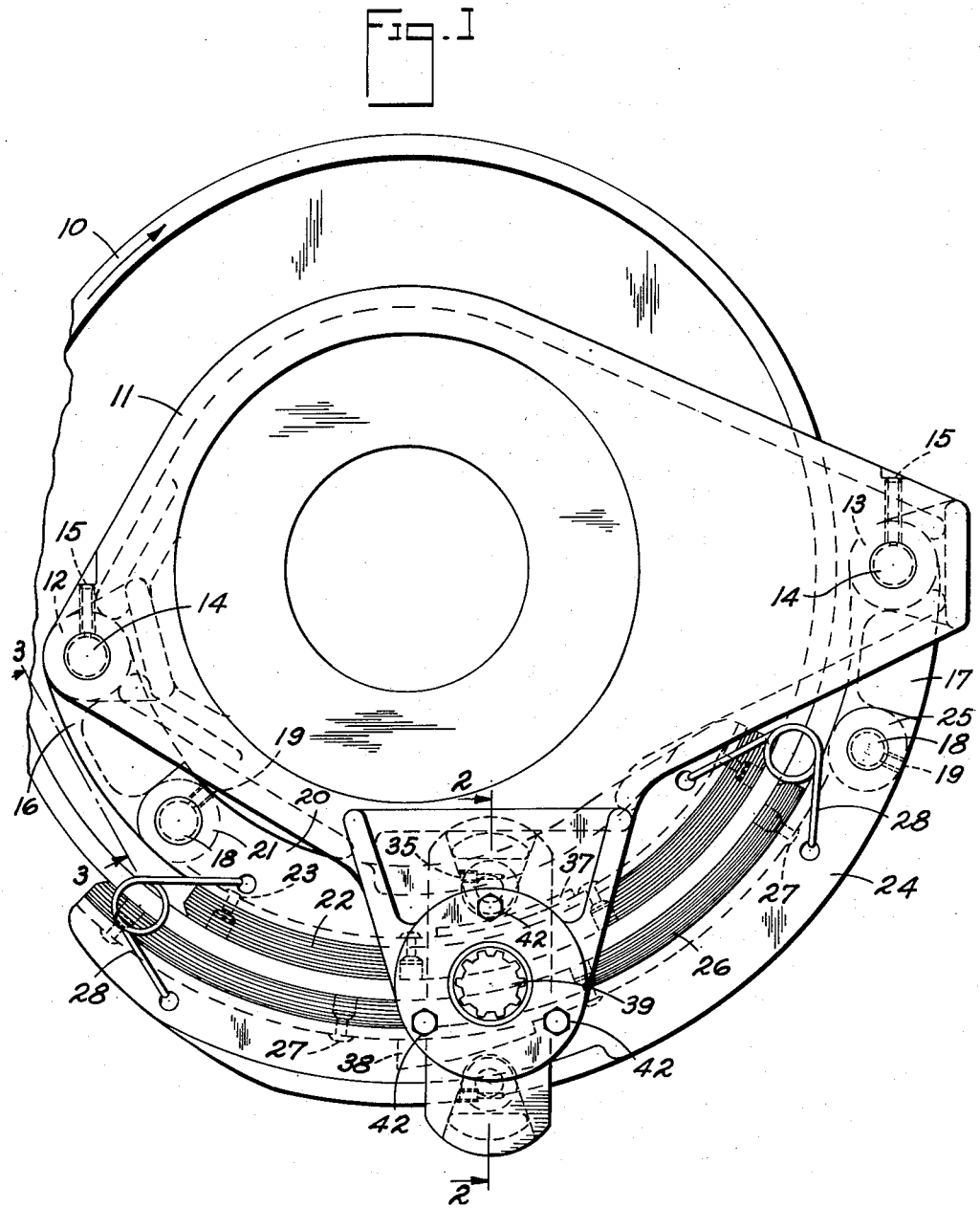
Fig. 1 is a side elevational view showing the brake assembly mounted for operation on a conventional vehicle brake drum.
Figure 2:
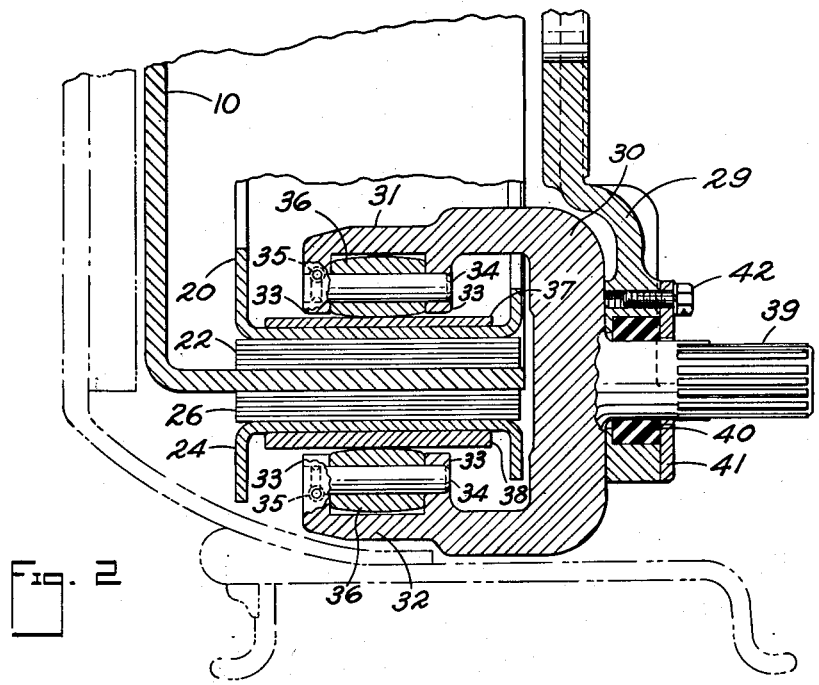
Fig. 2 is a cross-sectional view of the actuating assembly taken along line 2—2 in Fig. 1.
Figure 3:
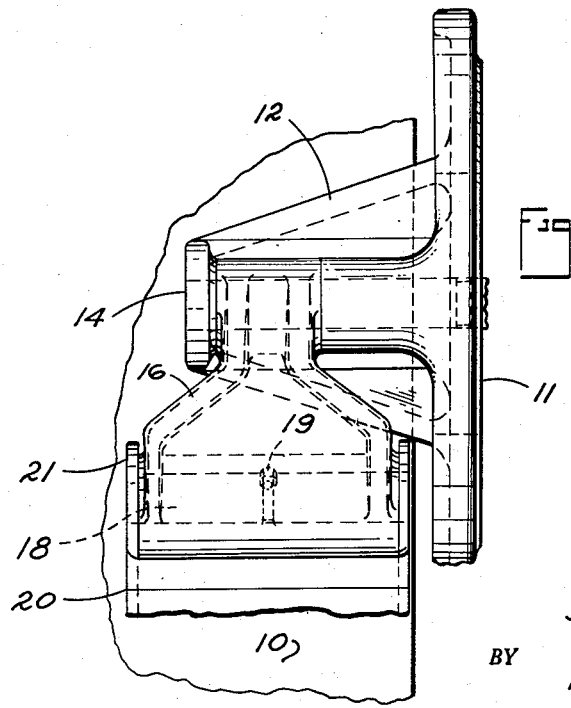
Fig. 3 is a fragmentary cross-sectional view of the hinge assembly taken along line 3—3 in Fig. 1.

In Fig. 1, the flange of the brake drum normally found on motor vehicle wheels is designated by the numeral 10 and for the purposes of this description, has a normal forward rotation in the direction of the arrows. The flange 10 has the usual machined surface on both the inside and outside diameters to present true circular surfaces to receive the braking elements. A flange 11 for carrying the brake assembly circumscribes the vehicle wheel and is rigidly affixed to the vehicle frame (not shown). A pair of brackets 12 and 13 extend laterally from the frame 11 and toward the wheel on which the drum 10 is mounted. The bracket 12 is disposed between the flange and the axle, and the bracket 13 is located on the side of the flange away from the axle. The brackets 12 and 13 are bored to receive a pin 14 which is parallel to the flange of drum 10 and is held in position by set screw 15.

A pair of hinges 16 and 17 are carried by the pins 14 for shifting movement toward and away from the drum 10. Hinge 16 has a pair of parallel bores, one for receiving pin 14 and the other for receiving pin 18 which is held in position in the hinge by means of set screw 19.

An inner brake shoe 20, having a channel cross-section, has the web curved to follow the radius of the inner surface of the drum 10. A pair of ears 21 at one end thereof are bored to receive pin 18 and hold shoe 20 against movement with drum 10 while providing the necessary articulation to allow the shoe 20 to move toward and away from drum 10. The usual brake lining 22 is shown mounted upon the surface of shoe 20 adjacent flange 10 and held in position by the rivets 23. A similar brake shoe 24 has a pair of ears 25 drilled to receive pin 18 which in cooperation with the hinge 17 holds shoe 24 on the outer periphery of drum 10 and allows lateral movement therebetween. Shoe 24 has brake lining 26 mounted thereon, the shoe and the lining being curved to present a complemental surface for bearing against the outside of drum 10. The lining 26 is held in place on shoe 24 by the use of rivets 27 passing therethrough.

The brake shoes 20 and 24 are normally biased away from flange 10 of the brake drum by the action of retractor springs 28 which maintain the shoes clear of the drum between operating intervals. A bracket 29 integral with frame 11 is disposed laterally of drum 10 and carries yoke 30 in its operable position. The yoke 30 is substantially U-shaped having a pair of legs 31 and 32. The leg 31 of yoke 30 is adjacent inner shoe 20 and leg 32 is adjacent outer shoe 24. Each of the legs 31 and 32 has a pair of lugs 33 in opposed relationship integral with the laterally extending portions of yoke 30. The lugs 33 are bored to receive pins 34 which are maintained in operating position by keys 35. A pair of rollers 36 mounted for rotation on pins 34 have their outer surfaces arcuate in the direction parallel to the axis of rotation. A hardened pad 37 in substantially uniform cross-section is mounted on the innermost surface of the inner brake shoe 20 and is engaged by the inner roller 36 in rolling relationship thereto when the brake assembly is placed in operation. A second cam-shaped pad 38 is mounted on the outer surface of the outer brake shoe 24 and receives the outer roller 36 in rolling relationship thereto as the force is applied to actuate the brakes. The pad 38 has a form which will minimize the travel necessary to apply the brake and also to insure an even braking pressure on both the inner and outer shoes 20 and 24 respectively as rollers 36 are moved along their respective paths of travel.

The yoke 30 has a splined laterally extending shaft 39 intermediate the legs 31 and 32 in opposed relation thereto. Shaft 39 is integral with yoke 30 and carries yoke 30 for rotation about an axis parallel to legs 31 and 32 intermediate rollers 36. The spline shaft 39 is mounted in a resilient bearing 40 of rubber or similar material, bearing 40 being lodged in a counter-bore in bracket 29 and maintained therein by plate 41 which is held in place by cap screws 42.

In operation, the brake shoes are brought into contact with drum 10 by applying a rotative force to shaft 39. This force is transmitted through yoke 30 to the rollers 36 which move toward the brake shoe as shaft 39 is rotated. Further, rollers 36 move along the respective pads as they travel toward the flange of the brake drum. The force applied to each brake shoe, therefore, is a function of the rotative force applied to shaft 39, since the inner roller is operating on a convex curvature and the cam 38 is so shaped to overcome this difference in form and to insure an equal force being applied to each of the inner and outer shoes. The resilient bearing 40 allows yoke 30 to align itself, thereby eliminating faulty operation due to irregularities or changes in the relative yoke position due to drum expansion caused by heating. The arcuate surface on the rollers provides positive contact when misalignment causes bearing 40 to distort, thus tilting the axis of rotation of the rollers.

By locating the hinge brackets on opposite sides of the center-line of the drum, it is possible to carry the brake shoe in a position in which they are both self-energizing, when the drum is rotating in a forward direction. Conversely, they are not self-energizing when the drum is rotated in a reverse direction and maximum braking is not required. Self-energization, as used herein, is defined as being the braking pressure applied to the shoes in addition to that pressure produced by the actuating means, the additional pressure resulting from the frictional force along the periphery of the drum cooperating with the brake shoe mounting means to obtain a force component toward the drum which multiplies the total braking effect. The outer shoe 24 is hingedly joined to the frame with the pivot spaced from the surface of the brake drum 10. The frictional force on the brake shoe may be considered to operate at the center of the shoe and the surface of the band engaging the drum. Tension, in the case of the outer shoe, produces a force along a line joining the hinge pin connected to the frame and the center of the shoe. Since this line falls between the pin 18 and the drum, a resultant force is produced tending to move the shoe toward the brake drum. A like result obtains in the case of the inner shoe except that the shoe is compressed throughout its length and the force causes the pin 18 to move toward the inner surface of the drum 10. The hinge mounting allows the brake shoes to move toward and away from the flange in uniform lateral increments along the length of the brake band. Thus, even wear and maximum braking force will be accomplished.

Although the foregoing description is necessarily detailed for completely setting forth the invention, it is to be understood that such specific terminology is not intended to be restrictive or confining, and that such modifications are included that may fairly come within the scope and spirit of the invention as herein claimed.

What is claimed is:

1. A brake assembly comprising a brake drum having a flange, internal and external brake shoes on opposite sides of said flange respectively and engageable therewith, mounting means for shiftably carrying said shoes for movement into and out of engagement with the drum, a U-shaped member rotatably carried by said means, the axis of rotation being between and parallel to the legs of the member, a roller on each leg of the member respectively for engagement with the shoes as said member is rotated whereby the shoes are biased toward each other and toward the drum for frictional engagement therewith.

2. A brake assembly comprising a brake drum having a flange, internal and external brake shoes on opposite sides of said flange respectively and engageable therewith, mounting means for shiftably carrying said shoes for movement into and out of engagement with the drum, a U-shaped member rotatably carried by said means, the axis of rotation being between and parallel to the legs of the member, each leg of the member respectively engaging a brake shoe as said member is rotated whereby the shoes are biased toward each other and toward the drum for frictional engagement therewith.

3. A brake assembly comprising a brake drum having a flange, internal and external brake shoes on opposite sides of said flange respectively and engageable therewith, mounting means for shiftably carrying said shoes for movement into and out of engagement with the drum, a U-shaped member rotatably carried by said means, the axis of rotation being between and parallel to the legs of the member, a bearing plate on each shoe respectively, said plates being intermediate the ends of the shoe and opposite the drum engaging portion thereof, each leg of the member respectively engaging a bearing plate as said member is rotated whereby the shoes are biased toward each other and toward the drum for frictional engagement therewith.

4. A brake assembly comprising a brake drum having a flange, internal and external brake shoes on opposite sides of said flange respectively and engageable therewith, mounting means for shiftably carrying said shoes for movement into and out of engagement with the drum, a U-shaped member rotatably carried by said means, the axis of rotation being between and parallel to the legs of the member, a bearing plate on each shoe respectively said plates being intermediate the ends of the shoe and opposite the drum engaging portion thereof, a roller on each leg of the member respectively for engagement with said plates as said member is rotated whereby the shoes are biased toward each other and toward the drum for frictional engagement therewith.

5. A brake assembly for a motor vehicle comprising a brake drum, internal and external brake shoes engageable therewith, a frame affixed to said vehicle, a pair of opposed hinges shiftably mounted on said frame, one of said hinges being inside of the brake drum and pivotally joined to the internal shoe and the other hinge being outside of the brake drum and pivotally joined to the external shoe, said internal shoe extending away from the hinge in a direction opposite to the normal rotation of said drum, said external shoes extending away from the hinge in a direction corresponding to the direction of normal rotation of said drum, and actuating means on the frame for shifting said shoes toward and away from said drum.

6. A brake assembly for a motor vehicle comprising a brake drum, internal and external brake shoes engageable therewith, a frame affixed to said vehicle, a pair of opposed hinges shiftably mounted on said frame, one of said hinges being inside of the brake drum and pivotally joined to the internal shoe and the other hinge being outside of the brake drum and pivotally joined to the external shoe, said internal shoe extending away from the hinge in a direction opposite to the normal rotation of said drum, said external shoes extending away from the hinge in a direction corresponding to the direction of normal rotation of said drum, a U-shaped member rotatably carried by said frame, the axis of rotation being between and parallel to the legs of the member, each leg of the member respectively engaging a brake shoe as said member is rotated whereby the shoes are biased toward each other and toward the drum for frictional engagement therewith.

7. A brake assembly for a motor vehicle comprising a brake drum, internal and external brake shoes engageable therewith, a frame affixed to said vehicle, a pair of opposed hinges shiftably mounted on said frame, one of said hinges being inside of the brake drum and pivotally joined to the internal shoe and the other hinge being outside of the brake drum and pivotally joined to the external shoe, said internal shoe extending away from the hinge in a direction opposite to the normal rotation of said drum, said external shoes extending away from the hinge in a direction corresponding to the direction of normal rotation of said drum, a U-shaped member rotatably carried by said frame, the axis of rotation being between and parallel to the legs of the member, a bearing plate on each shoe respectively said plates being intermediate the ends of the shoe and opposite the drum engaging portion thereof, a roller on each leg of the member respectively for engagement with said plates as said member is rotated whereby the shoes are biased toward each other and toward the drum for frictional engagement therewith.

References Cited in the file of this patent

UNITED STATES PATENTS

| Number | Name | Date |
|---|---|---|
| 1,511,976 | Markham | Oct. 14, 1924 |
| 1,835,593 | Chaustowich | Dec. 8, 1931 |
| 1,847,828 | Gerling | Mar. 1, 1932 |
| 1,936,569 | Bendix | Nov. 28, 1933 |
| 2,239,977 | Rosenberg | Aug. 29, 1941 |
| 2,265,578 | Rosenberg | Dec. 9, 1941 |
| 2,268,685 | Walther | Jan. 6, 1942 |